United States Patent [19]
Silverman et al.

[11] 3,863,937
[45] Feb. 4, 1975

[54] ADAPTER GASKET

[75] Inventors: Howard M. Silverman, Edison;
Herbert M. Laford, Verona, both of N.J.

[73] Assignee: Electro-Protective Corp., Newark, N.J.

[22] Filed: Nov. 2, 1973

[21] Appl. No.: 412,323

[52] U.S. Cl. .................................. 277/180, 285/197
[51] Int. Cl. ........................... F16j 15/10, F16l 5/00
[58] Field of Search ................ 277/180, 101, 9, 12; 285/197, 198, 199; 137/318

[56] References Cited
UNITED STATES PATENTS

| | | | |
|---|---|---|---|
| 2,693,975 | 11/1954 | Smith | 285/199 |
| 2,739,001 | 3/1956 | Childes | 277/180 |
| 3,272,534 | 9/1966 | Smith | 285/197 |
| 3,480,036 | 11/1969 | Ehrens et al. | 285/198 |
| 3,527,483 | 9/1970 | Dashner | 285/197 |
| 3,823,250 | 7/1974 | DeMonsy et al. | 285/197 |

*Primary Examiner*—Samuel B. Rothberg
*Assistant Examiner*—Robert I. Smith
*Attorney, Agent, or Firm*—Lerner, David, Littenberg & Samuel

[57] ABSTRACT

An improved adapter gasket is disclosed, including an arcuate gasket body having inner and outer cylindrical surfaces of different diameters, so as to mount various size pipes in pipe saddles. In a preferred embodiment, the adapter gasket also includes insert means for retaining said gasket in pipe saddles having apertures, such as for the insertion of various detecting or monitoring equipment through the gasket and into the pipe itself.

12 Claims, 6 Drawing Figures

ADAPTER GASKET

FIELD OF THE INVENTION

The present invention is concerned with the mounting of pipes in pipe saddles. More particularly, the present invention is concerned with the use of gaskets for mounting pipes which are retained firmly within pipe saddles. Still more particularly, the present invention concerns such gaskets which are adapted for the retention of various sized pipes within a single such pipe saddle.

BACKGROUND OF THE INVENTION

Where pipes of various sizes have been employed for the transportation of fluids between distant locations, it has been known to employ pipe saddles intermittently along the length of these pipes in order to provide rigid support for these pipes. It has thus been well known in this art to employ gaskets interposed between the pipe to be retained and the pipe saddle, such gaskets commonly made of flexible substances such as rubber, in order to protect both the pipe and the pipe saddle when said pipe is firmly compressed therewithin. In the prior art, however, it has been deemed essential that the outside diameter of the pipe conform with the diameter of the pipe saddle, and that the gasket employed conform to both these members, in order to maintain relatively equal pressure along the surface of the pipe, and to protect both the pipe and the pipe saddle from cracking or other damage.

Thus, U.S. Pat. No. 384,570, in discussing the clamping of the plate S over an opening in the tube, or pipe A, includes the patentee's description of a rubber packing, or gasket $f$, therebetween. As can be seen in FIG. 3, the diameters of the pipe and the saddle coincide, and thus the gasket, pipe and saddle each have the same diameter.

In U.S. Pat. No. 2,347,830, in discussing the insertion of flow indicators into pipes retained in pipe saddles, the patentee again includes a gasket or the like, C, between the saddle A and the pipe B. Again, as can be seen from FIG. 2 thereof, the gasket is merely inserted between the parallel walls of the like-diameter pipe and pipe saddle, to maintain a distance therebetween during clamping of the U-shaped strap D over the pipe to retain same within the pipe saddle.

Additionally, in those prior art techniques known for incorporating detectors or vanes within pipes which are retained in pipe saddles, where the use of an annular seal or gasket has been employed between the pipe and the pipe saddle, and around the aperture in the pipe saddle, such as in U.S. Pat. No. 2,966,133, the prior art has again taught the use of a gasket 18 positioned between the pipe saddle and the pipe, in order to provide a fluid-tight connection therebetween. Again, as can be seen in FIG 2 thereof, the pipes employed have a diameter which is identical to that of the pipe saddle, and again the gasket interposed therebetween has that very same diameter.

In view of the state of this art, it has become necessary for users to stock a large number of pipe saddles, or one size of pipe saddle for each size pipe to be utilized.

It is thus an object of the present invention to provide adapter gaskets which overcome these deficiencies of the prior art.

It is another object of the present invention to provide an adapter gasket for insertion between pipes of various sizes, in pipe saddles, where the outside diameter of the pipe is smaller than the diameter of the pipe saddle, such that when the pipe is compressed within the pipe saddle an equal pressure distribution is obtained across the face of said pipe saddle.

It is another object of the present invention to provide such adapter gaskets for retaining various sized pipes within pipe saddles, whereby over-compression and crushing of said gaskets is prevented.

SUMMARY OF THE INVENTION

In accordance with the present invention adapter gaskets are provided for mounting pipes in pipe saddles, said gaskets having an arcuate body portion having inner and outer cylindrical surfaces of differing diameters. Thus, the diameter of the outer cylindrical surface of said arcuate gasket body is of a size such that the surface thereof will conform to the pipe-retaining portion of a pipe saddle, while the diameter of the inner cylindrical surface of said arcuate gasket body is of a size to conform to the outside diameter of a pipe whose outside diameter is less than the diameter of the pipe-retaining portion of said pipe saddle. Therefore, the diameter of the outer cylindrical surface of the arcuate gasket body will be greater than the diameter of the inner cylindrical surface of said arcuate gasket body. In addition, rigid insert members may be disposed within said gasket body, transverse to both inner cylindrical surface and outer cylindrical surface of said arcuate gasket body, and preferably along the periphery thereof, and at points of increased thickness thereof, in order to prevent over-compression or crushing of the gasket body upon the retention of a pipe into the pipe saddle, usually by means of a U-bolt or stirrup.

Further in accordance with the present invention, where the pipe saddle is provided with an aperture within the pipe retaining portion thereof, the adapter gasket may include an arcuate annular insert member, communicating with the outer cylindrical surface of said arcuate gasket body, and of a shape to conform to the recess or aperture in the pipe-retaining portion of the pipe saddle, and both the arcuate gasket body and annular insert member will include corresponding apertures therethrough, so that fluid mounting equipment may pass through the gasket and into the pipe itself.

DESCRIPTION OF THE PREFERRED EMBODIMENTS

Figure 1:
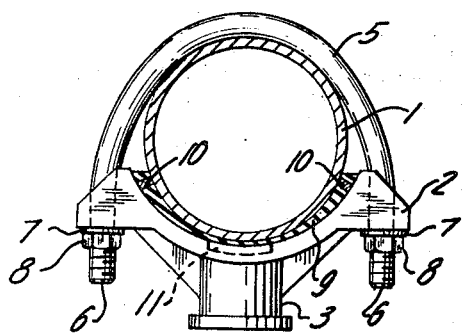
FIG. 1 is a partial sectional view of the adapter gasket of the present invention, mounting a pipe within a pipe saddle.
Figure 2:
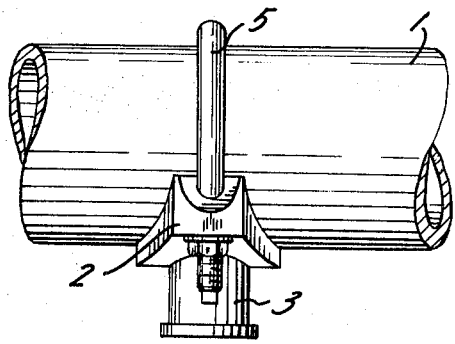
FIG. 2 is a perspective side view of a pipe being retained within a pipe saddle.

Referring to FIGS. 1 and 2, a pipe 1 is to be retained in a pipe saddle 2, which is mounted on a base 3. The improved gasket of the present invention, generally designated 9, is disposed between the outside diameter of the pipe 1 and the pipe-retaining concave portion of the pipe saddle 2. The gasket itself may be made of a compressible, flexible substance, such as rubber, neoprene, or any other suitable material. The pipe 1 is secured within the pipe-retaining portion of the pipe saddle 2 by a stirrup or U-bolt 5 which encircles the outer portion of the pipe 1 which is not within the pipe-retaining portion of the pipe saddle 2. The U-bolt 5 is then tightened thereover, by means of washers 7 and nuts 8, so as to compress the pipe towards the pipe-retaining portion of the pipe saddle. Thus, the threaded ends 6 of the U-bolt 5 are received through bolt apertures in the pipe saddle 2, and then retained therein by the tightening of nuts 8. Additionally, FIG. 2 shows the base 3 connected to a housing 4. Such a housing may be employed in conjunction with a preferred embodiment of the present invention, to be discussed below, wherein the pipe saddle 2 includes an aperture in its pipe-retaining portion for the insertion of a vane therethrough. Thus, the use of various measuring and detecting equipment in conjunction with the pipes and pipe saddles associated with the present invention is made possible.

Figure 3:
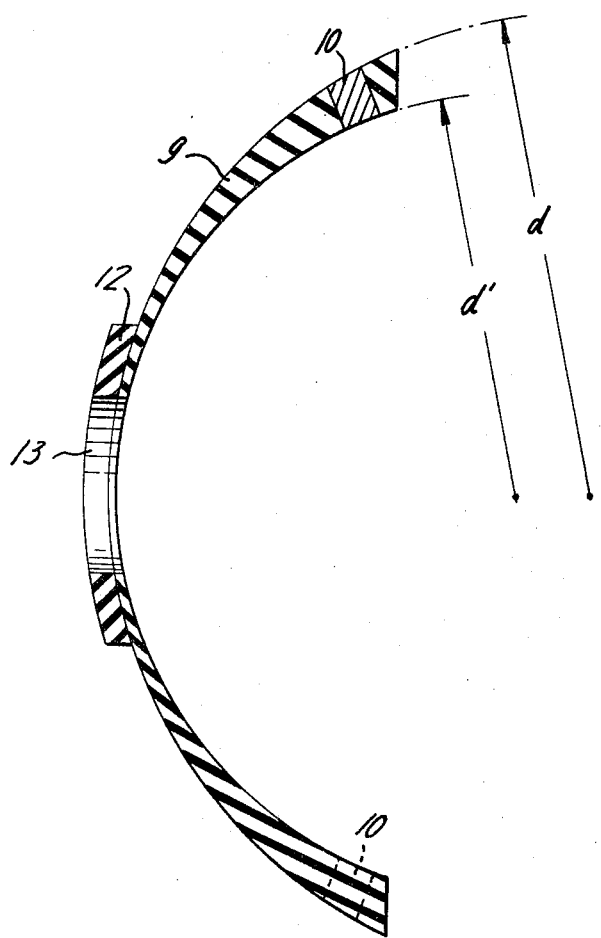
FIG. 3 is a sectional view of the adapter gasket of the present invention, having rigid insert members and an arcuate annular insert member.
Figure 4:
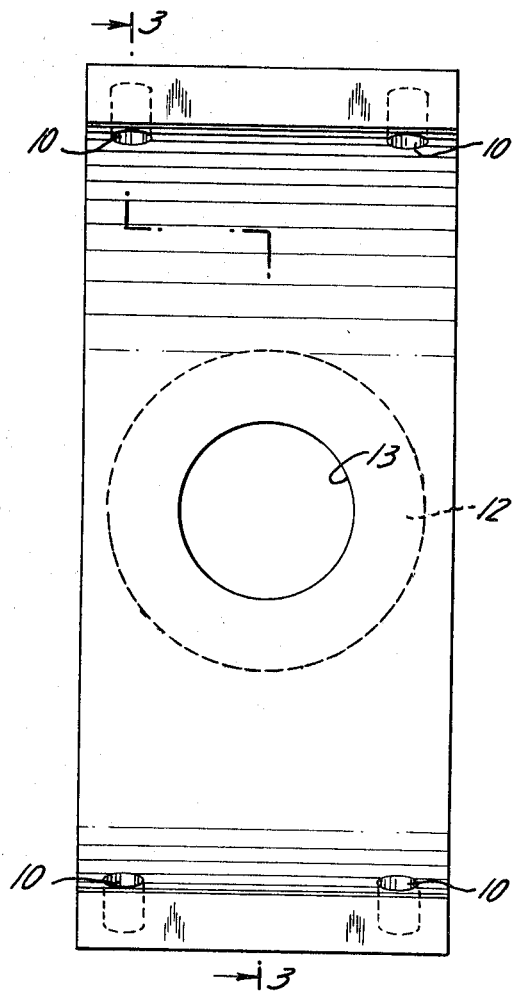
FIG. 4 is an elevational perspective view of the adapter gasket of the present invention.

Referring to FIGS. 3 and 4, a more detailed view of the gasket 9 of the present invention may be seen. Generally, the gasket itself includes a body, generally designated 9, which is generally arcuate in shape, but whose outer and inner cylindrical surfaces have diameters of different sizes. More specifically, as shown in FIG. 3, the diameter of the outer cylindrical surface of the arcuate gasket body is designated $d$, and the diameter of the inner cylindrical surface of the arcuate gasket body is designated $d'$. As shown $d'$ is smaller than $d$. The adapter gasket of the present invention is thus capable of mounting pipes having an outer diameter of $d'$, which is smaller than the diameter of the pipe-retaining portion of the pipe saddle 2, that is, having a diameter of $d$. It thus becomes possible to mount such pipes having diameters smaller than that of the pipe-retaining portion of the pipe saddle, while maintaining equal depression and pressure distribution over the entire area of the gasket communicating with both the pipe and the pipe saddle.

In accordance with a preferred embodiment of the present invention, the present gasket can be employed in conjunction with pipe saddles, which include apertures within their pipe-retaining portion, to permit the insertion of fluid measuring or mounting devices, such as vanes (see FIGS. 5 and 6) therethrough, and within the pipe itself. Such pipe saddles include an aperture, and an annular recessed area surrounding that aperture, for the retention of an annular gasket therewithin. In order to adapt to such a system, the present gaskets may include an annular arcuate insert member 12, either attached to, or communicating with, but separate from, gasket body 9, disposed on the convex or lower portion thereof. The diameter of said annular arcuate insert member 12 being of a size to fit securely within the annular recess surrounding the aperture in the pipe-retaining portion of the pipe saddle 2. In addition, both the adapter gasket body 9 and the arcuate insert member 12 will have corresponding apertures 13 disposed therethrough, said apertures 13 being of the approximate size of the aperture in the pipe-retaining portion of the pipe saddle 2, and will be of the diameter such that the body of the vane may pass therethrough, as seen in FIG. 5.

Rigid insert members 10, preferably composed of various metals or other non-compressible materials, may be disposed within the arcuate gasket body 9, transverse to both its inner cylindrical surface and outer cylindrical surface, communicate with both the inner and outer cylindrical surfaces thereof, in order to prevent compression or crushing of said adapter gasket body 9. The rigid insert members 10, may be solid or hollow tubular inserts, which may be flush with both the concave-inner and convex-outer cylindrical surfaces of the arcuate gasket body 9, or which may be countersunk slightly within the inner and outer cylindrical surfaces of the arcuate gasket body, in order to permit a slight compression of the adapter gasket body at the point where the rigid insert members 10 are located.

Figure 5:
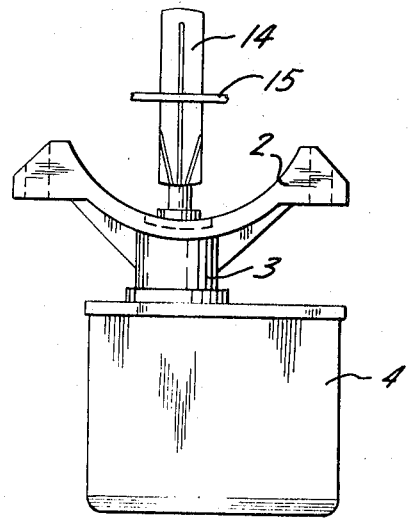
FIG. 5 is a partial sectional view of a vane and annular insert member being inserted into a pipe saddle aperture.
Figure 6:
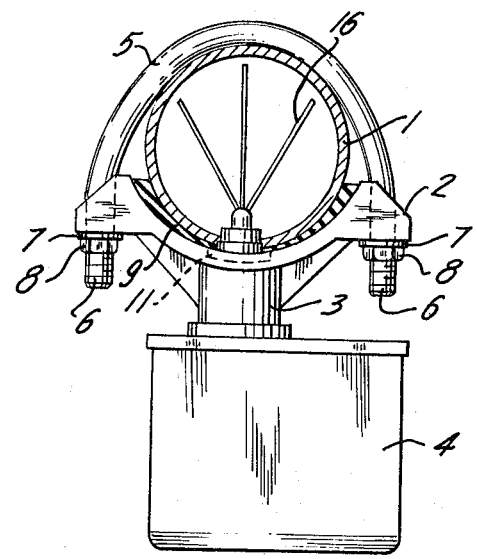
FIG. 6 is a partial sectional view of an adapter gasket of the present invention mounting a pipe within a pipe saddle, and retaining a vane within said pipe.

As can be seen in FIGS. 5 and 6, the gasket of the present invention may itself be adapted to permit its use in conjunction with signalling devices, such as the flow detector of U.S. Pat. No. 2,966,133, inserted through an aperture in the pipe saddle 2, and the pipe 1 itself. That flow detector includes vanes 16 which are disposed within the interior of the pipe 1, and pivotally connected so that flow in the pipe 1 will cause movement of the vanes 16, which movement may be transmitted into housing 4 for further transmittal or signalling.

It can thus be seen that by utilization of the adapter gaskets of the present invention varying sized pipes may be retained within a single pipe saddle by the selection of a proper adapter gasket of the present invention having an outer cylindrical surface with a diameter $d$ to conform with the pipe-retaining portion of the pipe saddle, and having an inner cylindrical surface with a diameter $d'$ of a size to conform with the outside diameter of the particular pipe chosen. If, subsequently, a pipe having a different outside diameter $d'$ is intended for use in the same pipe saddle, then the adapter gasket may be easily removed from the pipe saddle, and replaced with another appropriate adapter gasket. In this manner one pipe saddle can be adapted to contain a number of varying sized pipes, while in actual use equal depression and/or pressure distribution over the area of pipe retention can be maintained when the pipes are compressed within the pipe saddle.

It should be emphasized, however, that the specific embodiment described and shown herein are intended as merely illustrative and in no way restrictive of the invention.

What I claim is:

1. A gasket for mounting pipes in pipe saddles, said gasket comprising an arcuate gasket body, said arcuate gasket body including an outer cylindrical surface of a first diameter, and said arcuate gasket body including an inner cylindrical surface of a second diameter, said second diameter being smaller than said first diameter.

2. The gasket of claim 1 including rigid insert members disposed within said arcuate gasket body, between said inner cylindrical surface and said outer cylindrical surface, to prevent compression of said gasket body at the point of placement of said insert members.

3. The gasket of claim 2 wherein said rigid insert members are disposed along the periphery of said arcuate gasket body, at a point of increased thickness thereof.

4. The gasket of claim 3 wherein said rigid insert members are countersunk within said arcuate gasket body.

5. The gasket of claim 4 wherein said rigid insert members communicate with both the inner cylindrical surface and the outer cylindrical surface of said arcuate gasket body.

6. A gasket for mounting pipes in pipe saddles, said gasket comprising an arcuate gasket body, said arcuate gasket body including an outer cylindrical surface of a first diameter, and said arcuate gasket body including an inner cylindrical surface of a second diameter, said second diameter being smaller than said first diameter, and including an arcuate annular insert member communicating with said outer cylindrical surface of said arcuate gasket body.

7. The gasket of claim 6 wherein said arcuate annular insert member is shaped to conform to a recess within said pipe saddle.

8. The gasket of claim 7 wherein both said arcuate annular insert members and said arcuate gasket body include conforming circular apertures therethrough, for the insertion of flow-detecting equipment through said gasket and into said pipe.

9. The gasket of claim 6 including rigid insert members disposed along the periphery of said arcuate gasket body, at a point of increased thickness thereof.

10. The gasket of claim 9 including a plurality of said rigid insert members.

11. The gasket of claim 6 wherein said rigid insert members are countersunk within said arcuate gasket body.

12. The gasket of claim 6 wherein said rigid insert members communicate with both said inner cylindrical surface and said outer cylindrical surface of said arcuate gasket body.

* * * * *